US012715192B2

(12) United States Patent
De Luca

(10) Patent No.: US 12,715,192 B2
(45) Date of Patent: Aug. 25, 2026

(54) CONTINUOUS PROCESS FOR FORMING DOMED PAPER AND STRUCTURES

(71) Applicant: Little Feet Packaging, Inc., Wilmington, DE (US)

(72) Inventor: Nicholas P. De Luca, Carmel-by-the-Sea, CA (US)

(73) Assignee: Little Feet Packaging, Inc., Wilmington, DE (US)

( * ) Notice: Subject to any disclaimer, the term of this patent is extended or adjusted under 35 U.S.C. 154(b) by 19 days.

(21) Appl. No.: 18/407,470

(22) PCT Filed: Jul. 9, 2022

(86) PCT No.: PCT/US2022/073581
§ 371 (c)(1),
(2) Date: Jan. 9, 2024

(87) PCT Pub. No.: WO2023/283653
PCT Pub. Date: Jan. 12, 2023

(65) Prior Publication Data

US 2024/0343012 A1 Oct. 17, 2024

Related U.S. Application Data

(60) Provisional application No. 63/220,211, filed on Jul. 9, 2021.

(51) Int. Cl.
*B29C 59/02* (2006.01)
*B31D 5/00* (2017.01)
(Continued)

(52) U.S. Cl.
CPC ............ *B31D 5/006* (2013.01); *D21F 11/006* (2013.01); *B29C 2037/90* (2013.01);
(Continued)

(58) Field of Classification Search
CPC ................ B29C 2037/90; B29C 59/02; B29C 2795/007; B31D 5/006; B31D 2205/0047;
(Continued)

(56) References Cited

U.S. PATENT DOCUMENTS 5,454,642 A 10/1995 DeLuca
6,116,000 A 9/2000 Perkins et al.
(Continued)

FOREIGN PATENT DOCUMENTS

WO 2002002308 A1 1/2002

OTHER PUBLICATIONS

International Search Report for PCT/US2022/073581 (dated Nov. 1, 2022).

*Primary Examiner* — Leo B Tentoni
(74) *Attorney, Agent, or Firm* — Capitol City TechLaw; Jasbir Singh

(57) ABSTRACT

A process and system for making a domed product by forming domes or protrusions into a sheet. The process including: moving a die set comprising one or more domes or protrusions, wherein the die set selectively registers with the sheet; latching the die set to the sheet after the selectively registering; and pressing the one or more domes or protrusions of the die set into the sheet for a period to obtain the domed product, wherein the die set moves independently from the sheet prior to the latching.

18 Claims, 18 Drawing Sheets

(51) Int. Cl.
*B31F 1/07* (2006.01)
*D21F 11/00* (2006.01)
*B29C 37/00* (2006.01)

(52) U.S. Cl.
CPC ............................ *B29C 2795/007* (2013.01); *B31D 2205/0047* (2013.01); *B31D 2205/0082* (2013.01); *B31D 2205/0088* (2013.01); *B31F 2201/0707* (2013.01); *B31F 2201/0779* (2013.01); *B31F 2201/0782* (2013.01)

(58) Field of Classification Search
CPC .... B31D 2205/0082; B31D 2205/0088; B31F 1/07; B31F 2201/0707; B31F 2201/0779; B31F 2201/0782; D21F 11/006
USPC ........ 264/40.1, 284; 425/385; 162/117, 362; 493/188, 264, 267, 320, 331
See application file for complete search history.

(56) References Cited

U.S. PATENT DOCUMENTS

| | | | | |
|---|---|---|---|---|
| 9,315,312 | B2 | 4/2016 | DeLuca et al. | |
| 10,870,949 | B2 | 12/2020 | DeLuca | |
| 2002/0093186 | A1* | 7/2002 | Bullock .................... | B31F 1/07<br>281/29 |
| 2005/0147774 | A1 | 7/2005 | Lee | |
| 2005/0167866 | A1* | 8/2005 | Hennessey ............ | B29C 43/021<br>264/284 X |
| 2008/0022821 | A1* | 1/2008 | Hendrik .................... | B26F 1/40<br>83/277 |
| 2013/0171422 | A1* | 7/2013 | De Luca ................ | B31D 5/006<br>428/172 |
| 2018/0154416 | A1 | 6/2018 | Hirata | |
| 2020/0208349 | A1 | 7/2020 | DeLuca | |
| 2021/0095428 | A1 | 4/2021 | Yoo et al. | |
| 2021/0122504 | A1 | 4/2021 | DeLuca | |

* cited by examiner

CONTINUOUS PROCESS FOR FORMING DOMED PAPER AND STRUCTURES

CROSS-REFERENCE TO RELATED APPLICATIONS AND INCORPORATION BY REFERENCE

The present application is a continuation of International Application No. PCT/US2022/073581, filed Aug. 4, 2022, which claims the benefit of U.S. Provisional Application No. 63/220,211, filed Jul. 9, 2021, which are all incorporated herein by reference in their entireties.

FIELD

The present disclosure teaches a process for making domed paper for use in applications such as packaging or envelopes as that further described by De Luca et al. in U.S. Pat. No. 9,315,312B2 "Domed Multilayer Cushioning Article" as well as by De Luca et al. in U.S. Pat. No. 10,870,949 "Manufacturing Process for Forming Domed Paper" and US Patent Publication 2021/0122504 "Integration of a Liner Within an Automated Process for Filling". The process incorporating those elements and further including means for forming the domed paper using a continuous process instead of a process that requires the web and paper to stop moving during the pressing.

BACKGROUND

Void fill paper cushioning, cushioning wrap, and envelopes with liners are commonly used for the purpose of mailing and shipping packages. In U.S. Pat. Nos. 5,454,642 and 6,116,000 De Luca describes various methods for integrating air cushioning products with boxes or envelopes. In U.S. Pat. No. 9,315,312B2 "Domed Multilayer Cushioning Article" as well as U.S. Pat. No. 10,870,949 "Manufacturing Process for Forming Domed Paper", De Luca describes a paper dome cushioning product that can be formed and integrated within an envelope. In US Patent Publication 2021/0122504 "Integration of a Liner Within an Automated Process for Filling" De Luca describes a system for forming mailers and further filling said mailers.

In all these systems, the formation of the domed paper requires that the paper be registered in a location with respect to the die press such that the pressing plate registers with the cuts on the paper. In order to improve cost efficiencies, the forming presses used are large in nature, requiring approximately 1-5 pounds per square inch of pre-pressed substrate in order to form the dome. With single stamping sizes as large as 12-20 square feet per press, many thousands of pounds of force from the press are required to form the domes. Such high forces require heavy presses that can weigh upwards of 5-10,000 lbs and thus the increase of production capability by using many of such large presses can be difficult. Further, if trying to place pressing systems to form the domed material at e-commerce shipping facilities or facilities that are smaller such as a distribution storage, a large press is not feasible for most applications.

Another difficulty associated with using large press dies that cycle intermittently is that each die generally needs to have its own internal heating system and control system. Further, large dies require significant power (on the order of 3-6 kw) and as the dies are mounted to the presses, a cooling system or cooled interface may be required to prevent heat from transferring to the press. If unmitigated, the heat can cause the press to bind and "lock" due to the difference in expansion rates of various press components including plates and posts.

When forming the domes per U.S. Pat. No. 9,315,312B2 "Domed Multilayer Cushioning Article" as well as U.S. Pat. No. 10,870,949 "Manufacturing Process for Forming Domed Paper" and US Patent Publication 2021/0122504 "Integration of a Liner Within an Automated Process for Filling" the substrate is located below the press, stopped, pressed, and then moved. Domes made from a substrate with two layers of kraft paper ranging in thickness from 0.003-0.007 inches, (ie. 30 lb-70 lb basis weight) and pressed at a temperature of approximately 375 degrees F. will require approximately 3-4 seconds for a 0.005" layer of starch based adhesive between the paper layers. By increasing the platen temperature, and decreasing the adhesive thickness, press times closer to 1-2 seconds have been achieved though consistency in product produced is more difficult to achieve.

Once the pressing is complete, the paper needs to be indexed forward and moving the paper requires that the paper be accelerated from a resting position. For a press length of 36", the average speed achieved during movement (through acceleration and deceleration) is approximately 1 ft/second, thus requiring approximately 3 seconds to index forward. Moving the paper faster by increasing the acceleration and velocity profiles can cause the paper to rip and produce inferior product. Correct registration under the die of the indexed substrate further requires 0-2 seconds as the material has to be moved at a slower velocity in order to match the registration marking with the sensor. Overall, the moving and registration process can take as long or more time than the press time and thus is a major contributor to the overall production time and cost to make the product.

One of the more obvious proposed solutions to removing the time associated with the indexing and registration step in forming the domes is to press the substrate between two or more continuously moving heated dimpled rollers. While this would seem to be a plausible solution, the registration of the material with respect to the die pattern is an inherent obstacle to using this technique. This difficulty is associated with the fact that as the paper is being pressed it can no longer be moved or adjusted in position with respect to the die. As such, an offset mismatch of a very small amount cumulatively adds together to form sequences of mismatched and matched press and paper segments.

It is therefore a primary objective of the following invention to provide a manufacturing process able to form domes per U.S. Pat. No. 9,315,312B2 and U.S. Pat. No. 10,870,949 and US Patent Publication 2021/0122504 "Integration of a Liner Within an Automated Process for Filling", wherein said process is continuous.

It is another objective of the invention that the process allow for continuous registration between the pressing dies and the substrate without requiring the substrate to stop moving.

It is further an object of the following invention that the process be easily scalable.

It is another object of the invention that the forming of domes using a smaller footprint die be economical.

It is another object of the invention that a complete pressing system that can form the domed material be small enough and capable of operating in a just in time manner to be placed within an ecommerce or small distribution facility.

SUMMARY

The present teachings describe a process for making a paper domed material that is continuous and registered using smaller dies that move with the material.

A process and system for forming domes or protrusions from a sheet in a continuous manner including moving a die set that selectively registers with a sheet, where the die set moves independently from the substrate until the time it latches to the substrate and presses the one or more domes or protrusions for a period of time.

In some embodiments, the die set latches to a moving belt with the substrate sandwiched between the die set and the belt. The die set is maintained in a pressed configuration so as to form the domes in the substrate. After the domes are formed, the moving die set releases from the belt and the substrate (at the time the material has been formed) and the die set moves away from the pressed dome material and the belt. The belt may function as a backing plate when the die set is pressed into the substrate. In some embodiments, a backing plate other than the moving belt may be provided.

In some embodiments, auxiliary mechanisms may be attached for use during the pressing. In some embodiments, auxiliary mechanisms for use after the pressing may be provided. Exemplary auxiliary mechanisms may include one or more perforation cut knifes, envelope formers or the like.

In some embodiments, the die set may be heated and temperature controlled independently or a convective, radiative, or conductive heater may be placed adjacent to the moving die such that multiple dies can be heated with the same heater as each die moves.

In some embodiments, a pneumatic or electric actuation system to press the die set may also move with the die set or a single actuation device can be used to press each of the smaller dies. In some embodiments, the die set may be pressed into a foam material and/or into a negative molded part.

In some embodiments, the engagement of the die set to the belt and substrate uses an engagement mechanism. An exemplary engagement mechanism may include a rotational lever that moves just before the engagement is to occur such that the belt and substrate can slip between the die set and the belt backing until the correct instant that the die set is supposed to press. The engagement mechanism when activated may interfere with the backing plate of the belt in such a way to allow for engagement during pressing and separation of the die set from the plane of the belt and substrate at the end of the cycle. In some embodiments, more than one engagement mechanism may be used for each die set. The more than one mechanism may be moved in unison.

In some embodiments, the movement of the engagement mechanism or the die set movement mechanism or temperature control of the die set is done remotely via a method such as Bluetooth. In some embodiments, the correct moment to press is determined using a visual element such as a mark or cut on the substrate. The system using sensors to detect the correct press point or time that comprise one or more of the following: a laser, a proximity sensor, a capacitance sensor, a camera, or an infrared sensor.

The movement of the die set involving one side of the die set always "facing" the same direction towards belt.

Any cabling and pneumatic lines may be placed so as to not interfere with the rotation including centered within the path of the die sets. In some embodiments, the path of the die set includes an acceleration zone where the die set is not attached to the substrate or belt. The die set may move faster than the belt so as to get into pressing position as quickly as possible.

In some embodiments, the path of the die set and substrate are the same along a circular path or a linear path. In some embodiments, the path of the die set moves in steps and includes means for transitioning via gate plates.

In some embodiments, multiple die set plates are used on the system. In some embodiments, the width of each die set plate is a fraction of a common perforation or cut length. Exemplary widths of a die set plate may be 1/6, 1/5, 1/4, 1/3, 1/2 or the Like Width of a cut pattern length.

In some embodiments, the press actuation is in a radial manner and on the same radius as the path of the substrate movement. In some embodiments, the die sets include balls. In some embodiments, the die sets can be modified to allow for forming pockets of selectively formed items. In some embodiments, the input material comes on a roll. Exemplary handling of the roll may be as disclosed in per co-pending PCT Application No PCT/US22/72333 ("Method and System for Forming Domed Paper and Structures") or U.S. Pat. No. 9,315,312 or U.S. Pat. No. 10,870,949.

In some embodiments, the substrate is moistened or steamed prior to pressing or an adhesive applied or activated. In some embodiments, the die set includes means for simultaneously cutting a pattern on the substrate and then pressing the substrate. In some embodiments, the machine includes a means for maintaining the substrate isolated from air or oxygen. In some embodiments, the machine includes a means for maintaining the substrate at a constant temperature or humidity.

In some embodiments, the die set includes die sets that move along at least two different paths along a length of the moving, and a gap between successive die sets of the die sets is adjustable prior to the pressing. In some embodiments, the adhesive layer is uncured. In some embodiments, the adhesive layer includes a pressure sensitive adhesive.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

Figure 1:
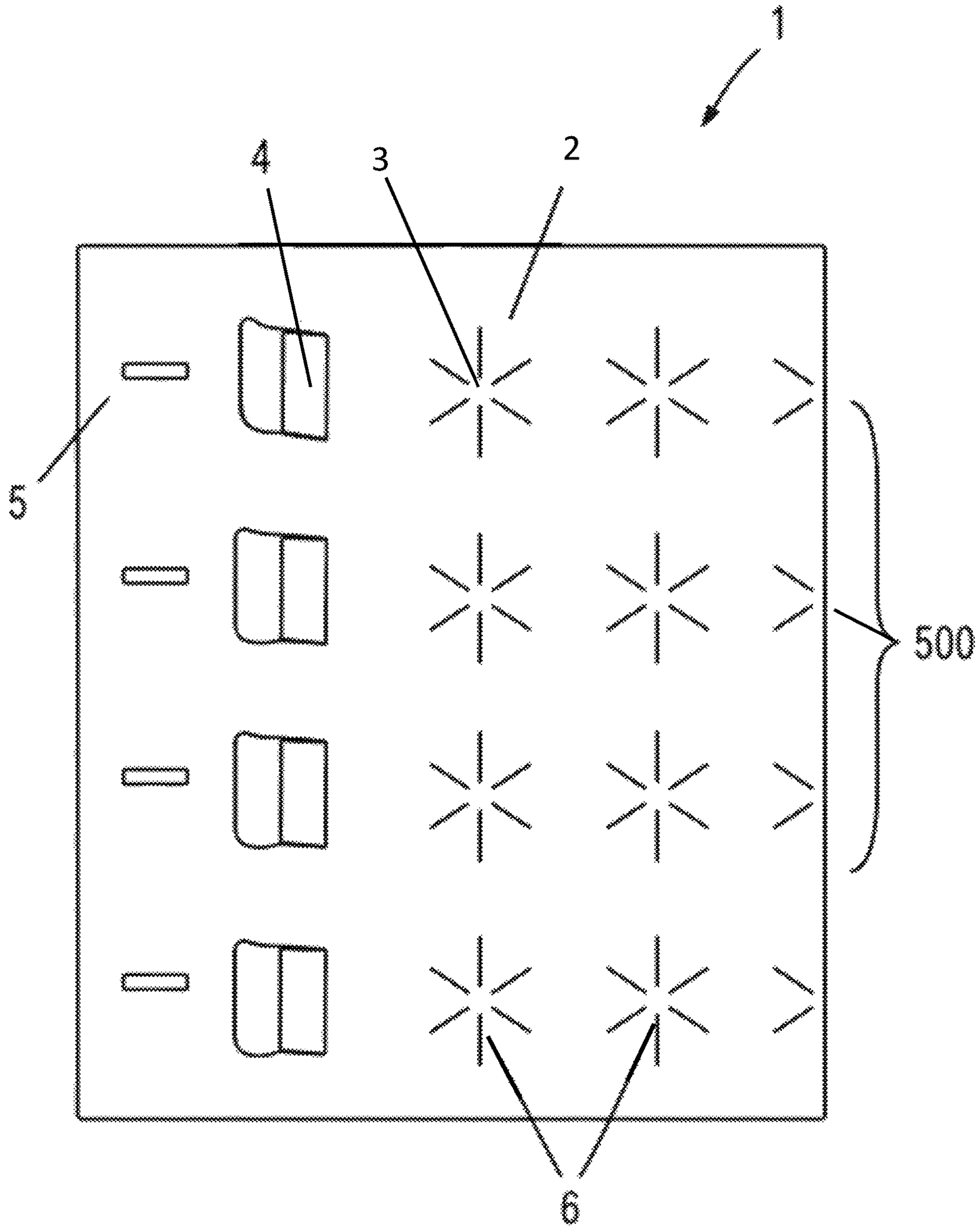
FIG. 1 is a photograph of a substrate ready to be pressed as described in U.S. Pat. Nos. 9,315,312B2 and 10,870,949 by De Luca.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION

The present teachings disclose a novel process for forming paper or other material with domes or protrusions.

FIG. 1 is a photograph of a substrate ready to be pressed as described in U.S. Pat. Nos. 9,315,312B2 and 10,870,949 by De Luca. Substrate 1 is formed from sheets 2 and cut with pattern 3. Cut registrations into the paper such as 3 or 4 can be used for locating the substrate 1 with respect to a press. Further, mark 5 that is printed on the paper using a non-VOC based ink and further printed so as to register with the horizontal locations 500 of cut patterns 3, 6 may alternatively be used to register the substrate to the press.

Figure 2:
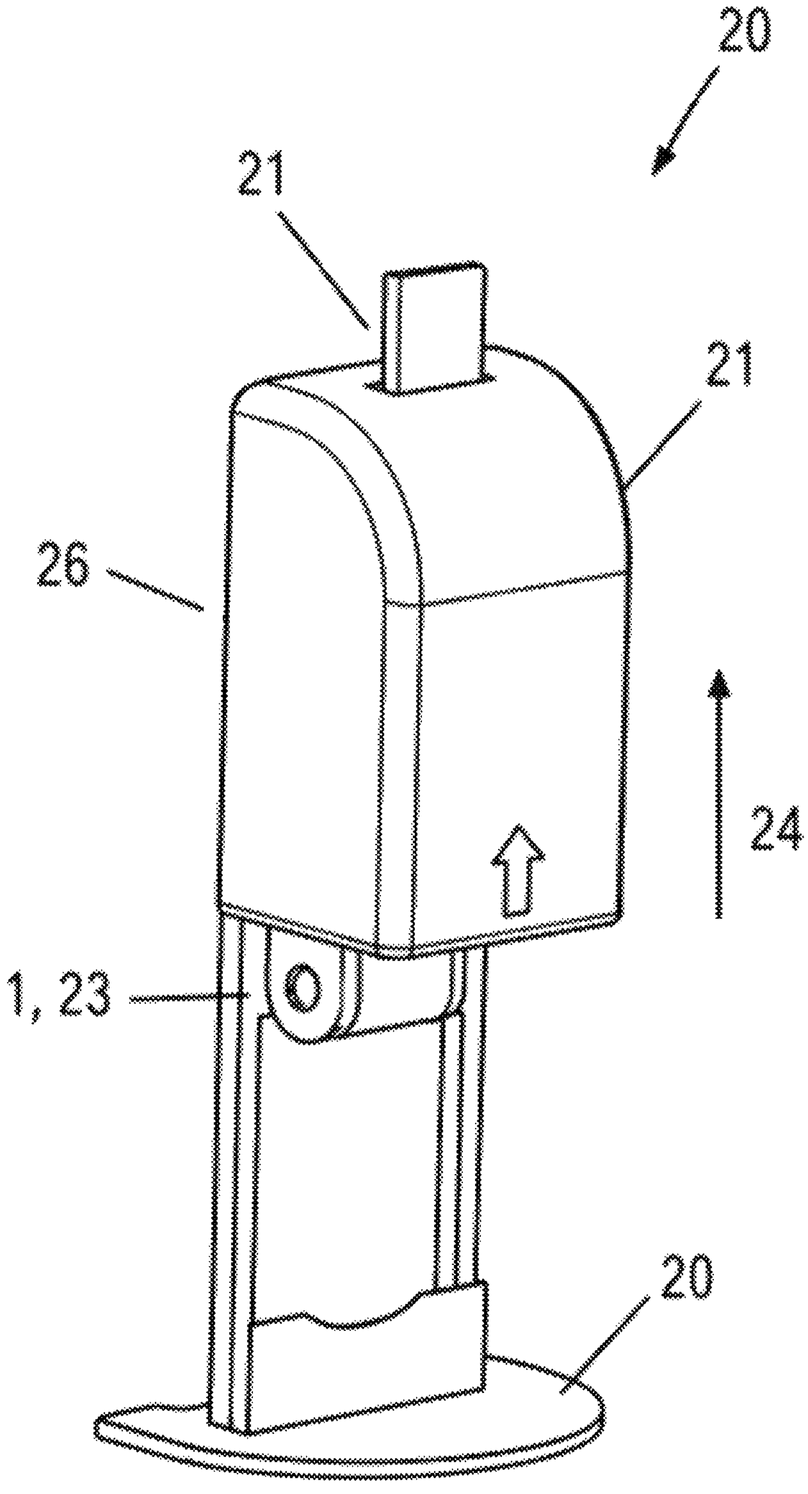
FIG. 2 is an isometric view of the exterior of the novel continuous forming system.

FIG. 2 is an isometric view of the exterior of the novel continuous forming system. Substrate 1 is formed into a continuous roll and placed adjacent to or under machine system 20. In this example, finished domed material 22 exits at the top of the equipment 20 and moves in direction 24. Machine system 20 could also be placed such that direction 24 is more horizontal or angled in a manner to better suit the intended application of the end customer. In the vertical configuration shown in FIG. 2, the machine 20 is supported in the vertical position by rails and stand 26 with enclosure 21.

Figure 3:
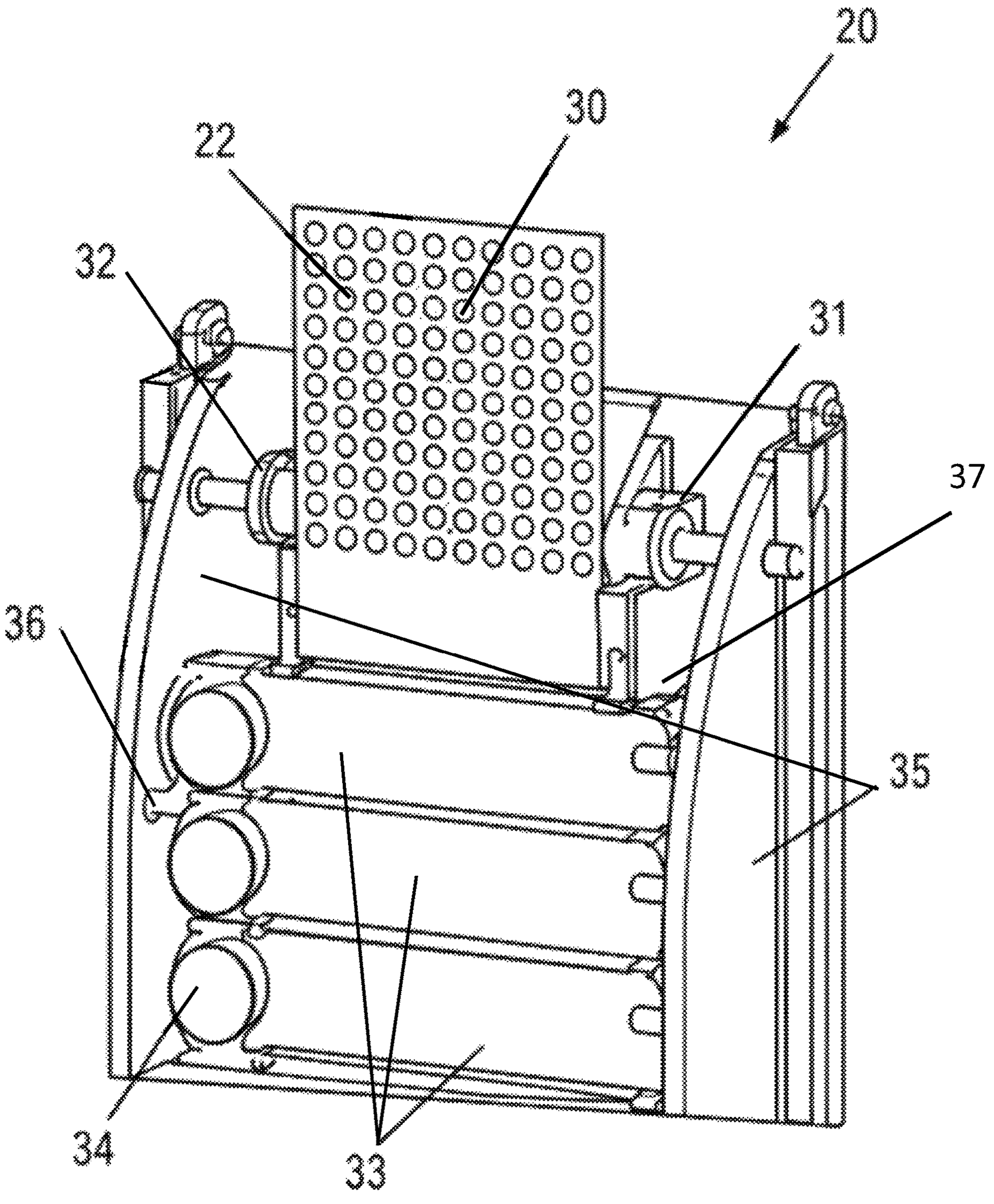
FIG. 3 is an isometric view of the interior of the novel continuous forming system showing multiple die units.

FIG. 3 is an isometric view of the interior of the novel continuous forming system 20 illustrating multiple die sets 33 riding along channels 36 located on plates 35. Gears 32 drive chains 31 used to support the backing plate 37 that multiple dies 33 press into via pistons 34 so at to form finished product 22 with domes 30. Dies 33 may be machined from a solid block of metal, cast using a technique such as sand casting, or formed by attaching via screws domed spheres. In addition, additive manufacturing techniques such as laser sintering can be used to make the dies. Dies can be integrated with heaters, sensors, perforation blades, or other components such as cutting dies or punch dies.

Figure 4:
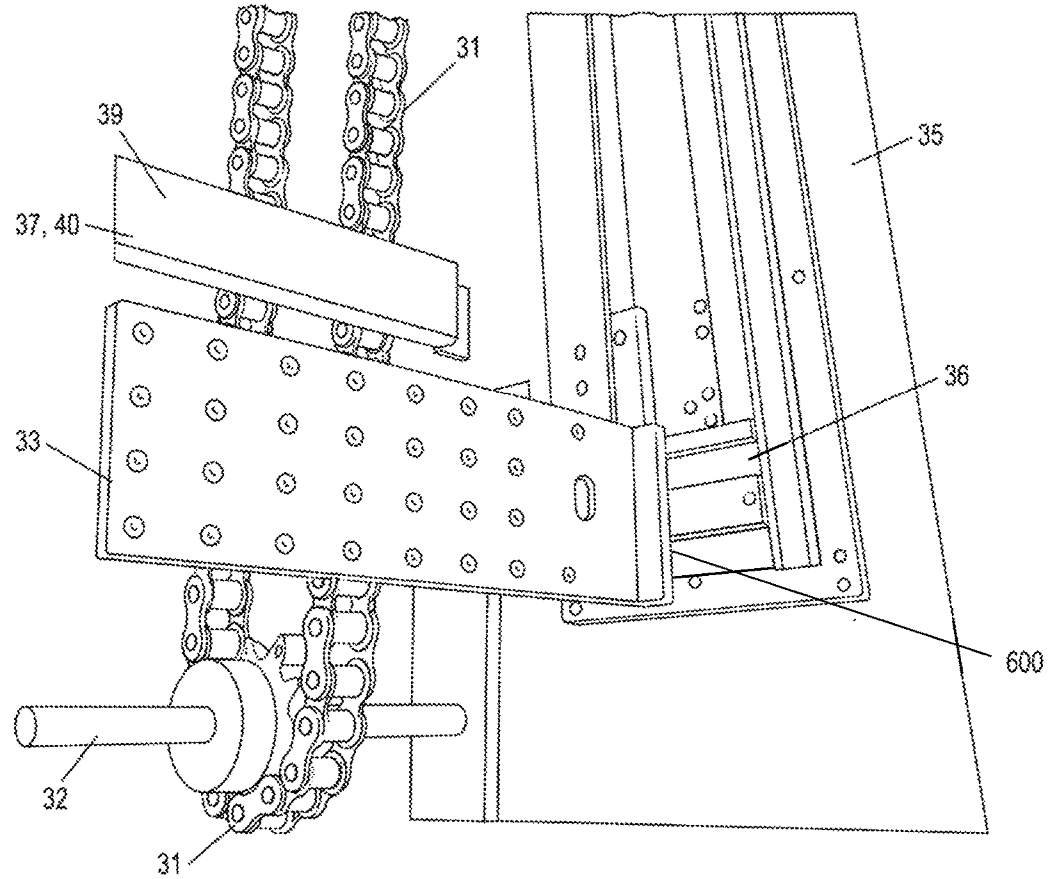
FIG. 4 is a photograph of a single die positioned to engage and form the substrate within the novel continuous forming system.

FIG. 4 is a photograph of a single die positioned to engage and form the substrate within the novel continuous forming system. Backing plates 37 are lined on surface 40 with a soft high temperature foam such as a silicone foam and move along with die 33 after engagement. Plates 600 help to maintain the perpendicularity of the die 33 with respect to plates 35 as they move.

Figure 5:
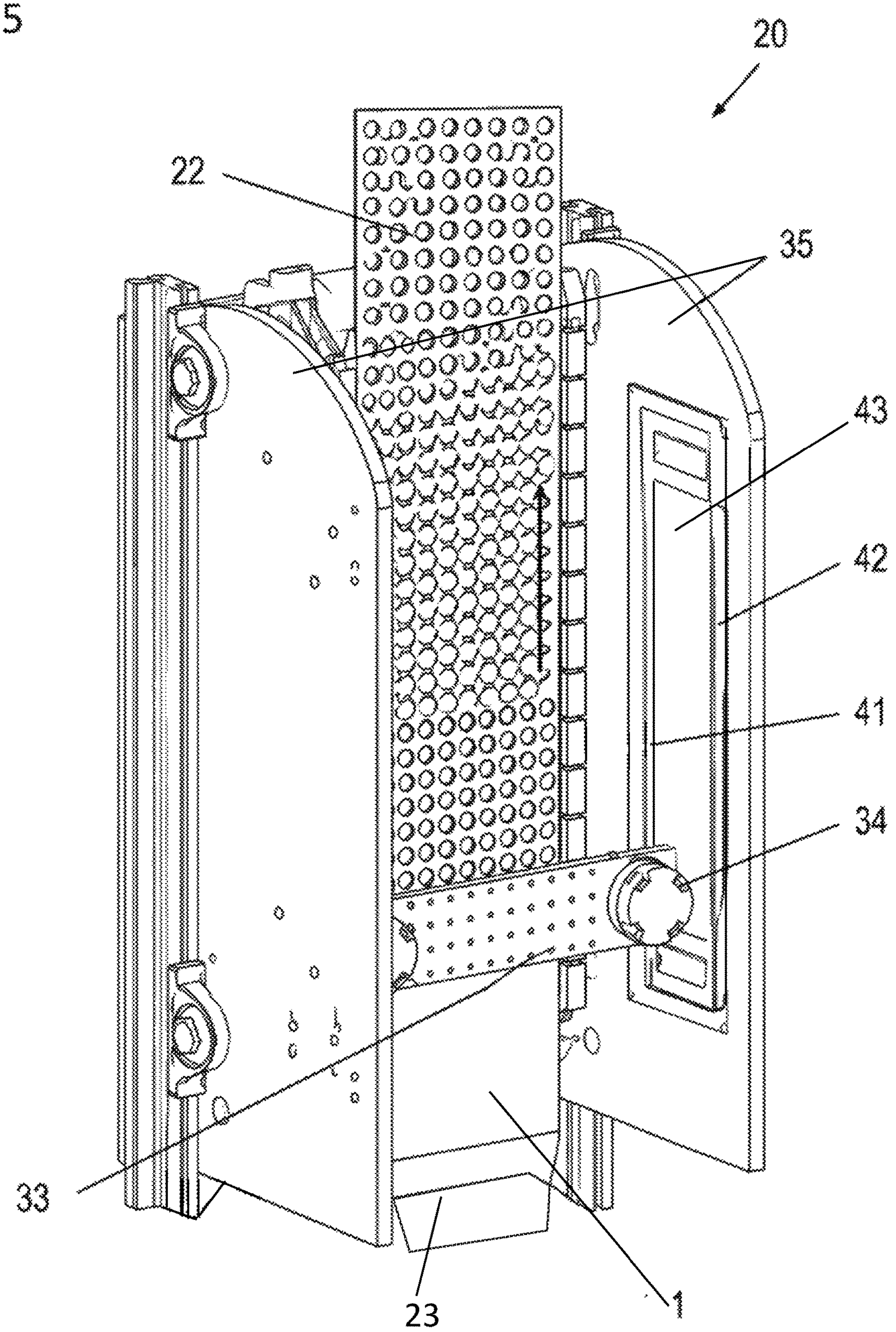
FIG. 5 is an isometric view of the interior of the novel continuous forming system further detailing the primary components.
Figure 6A:
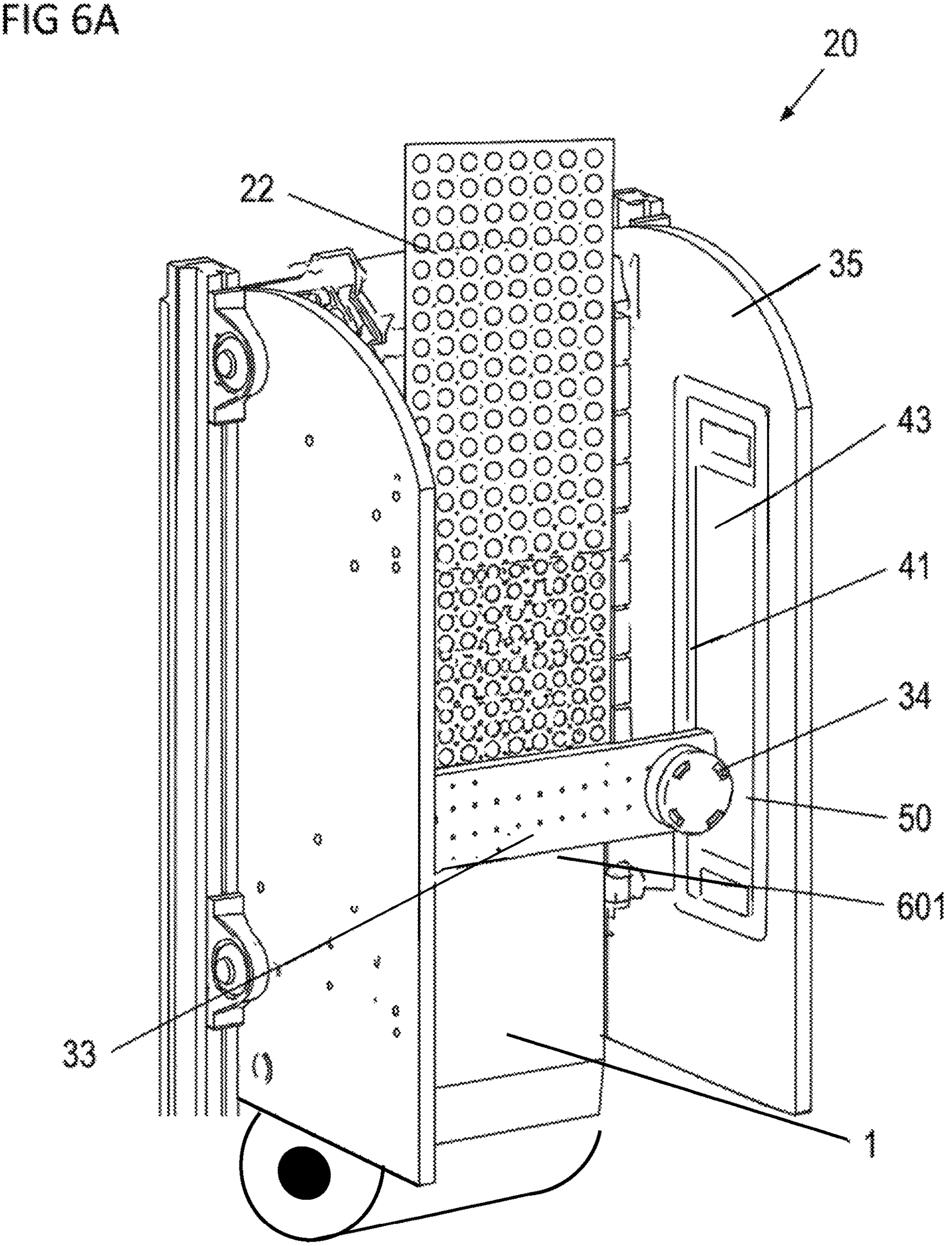
FIGS. 6A, 6B, 6C, 6D, and 6E are isometric drawings of the novel continuous forming system further illustration the motion of the dies within the unit.
Figure 6B:
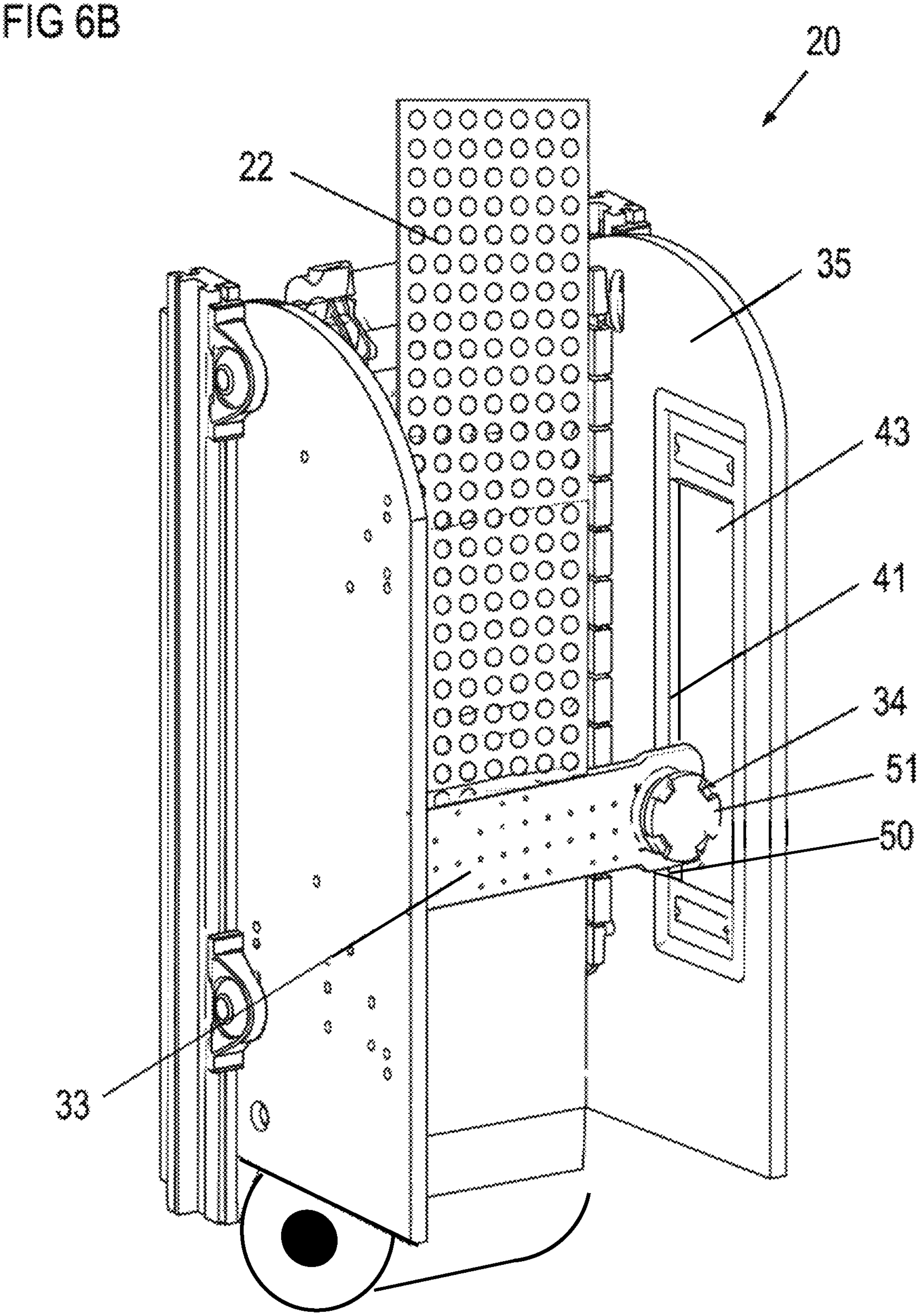
Figure 6C:
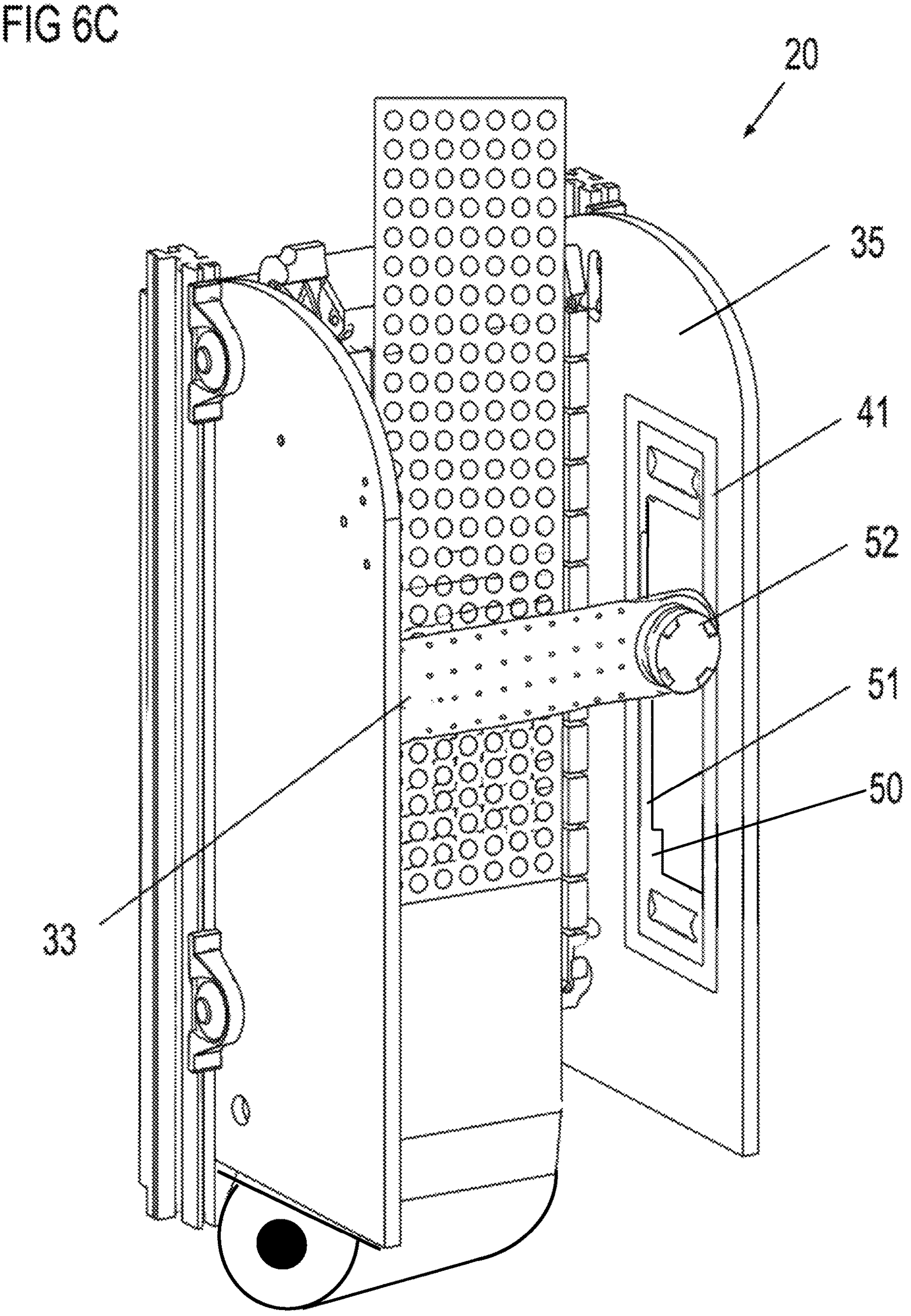
Figure 6D:
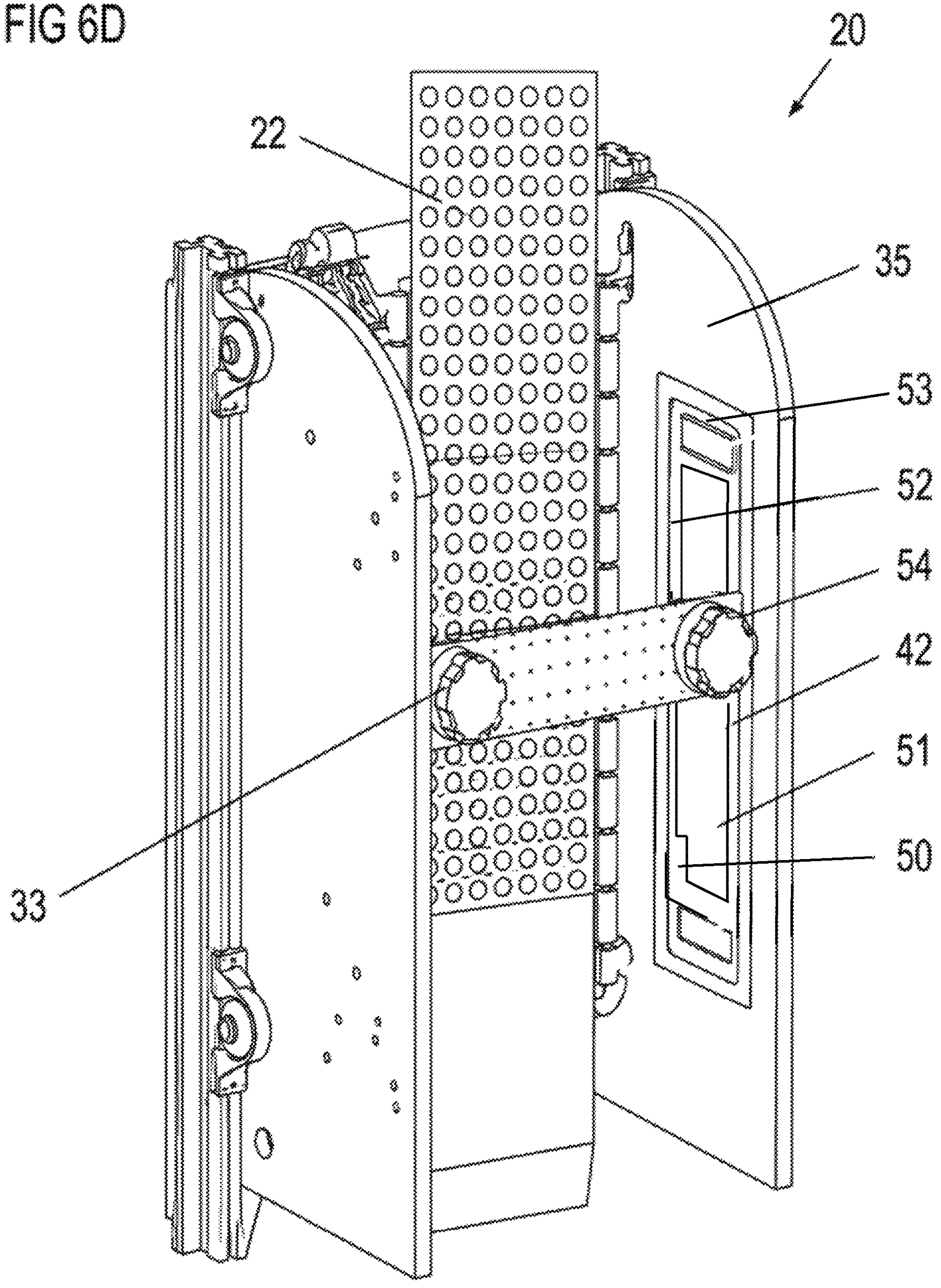
Figure 6E:
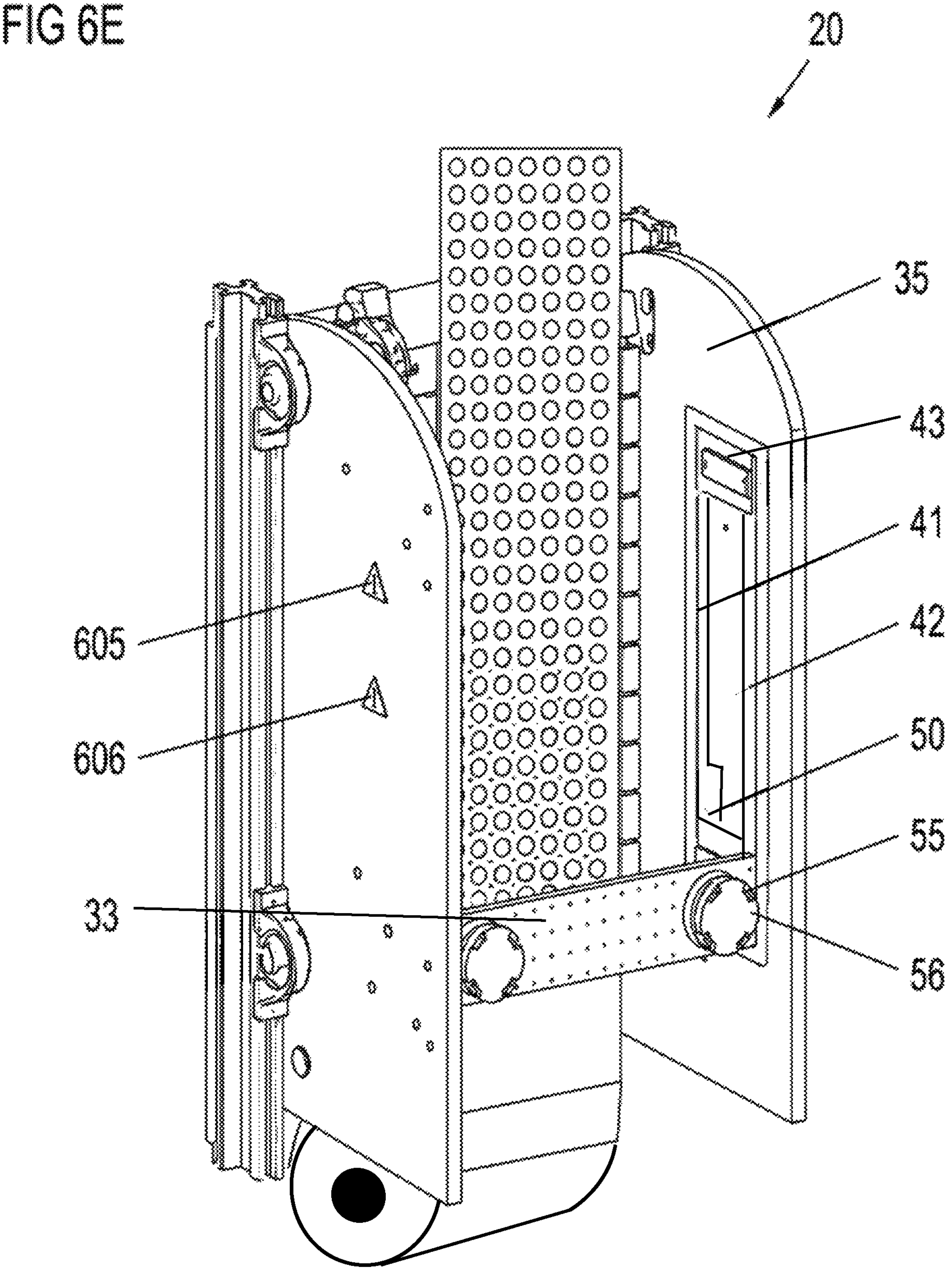

FIG. 5 is an isometric view of the interior of the novel continuous forming system further detailing the primary components such as the upwards forming channel 41 and the downward return channel 42 and a transition area 43 between the channels. These channels can be machined into plates 35 or molded such that die 33 can move freely.

FIGS. 6A, 6B, 6C, 6D, and 6E are isometric drawings of the novel continuous forming system further illustration the motion of the dies within the unit. Position 50 in FIG. 6A of die 33 is the engagement point when the pistons 34 or other engagement device actuates the die to engage with the belt formed by chain 31 and supports 39 and sandwiches substrate 1 in a registered position. Such position being determined by sensor 601 detecting printed registration marks 5 or cuts or physical detents such as 4 and or the cut pattern itself as 3 (as shown in FIG. 1). The activation sequence may be delayed with respect to the actual time the sensor detects the registration signal so as to account for any delay in physically moving the die 33. Once die 33 is engaged with and locked with the support back 39, it moves along channel 41 in parallel to direction of force applied by chain 31. As the substrate 1 and the die 33 move through position 51 and 52 in FIGS. 6B and 6C respectively, heat and pressure continue to be applied to form the cavities or domes 30. When the die 33 reaches position 53 shown in FIG. 6D, it is disengaged from support backing 39 and foam 40 on surface 37, thus releasing the substrate 1 in its completed formed state 22. Die 33 is subsequently moved into channel 42 to move to position 54 where it is staged in position 55 of FIG. 6E and moved forward for reengagement in area 56 prior to position 50 of FIG. 6A. The time taken for die 33 to move from position 50 to position 53 corresponds to the speed of chain 31 and further corresponds to the heat and pressure required to transfer the correct energy to substrate 1 to form 22. One or more sensors 605 generally located within enclosure 21 can monitor temperature, humidity, pressure, speed, and other factors associated with the quality of product 22 formed and using controller 606 can adjust the associated control factors to insure proper consistency.

Figure 7A:
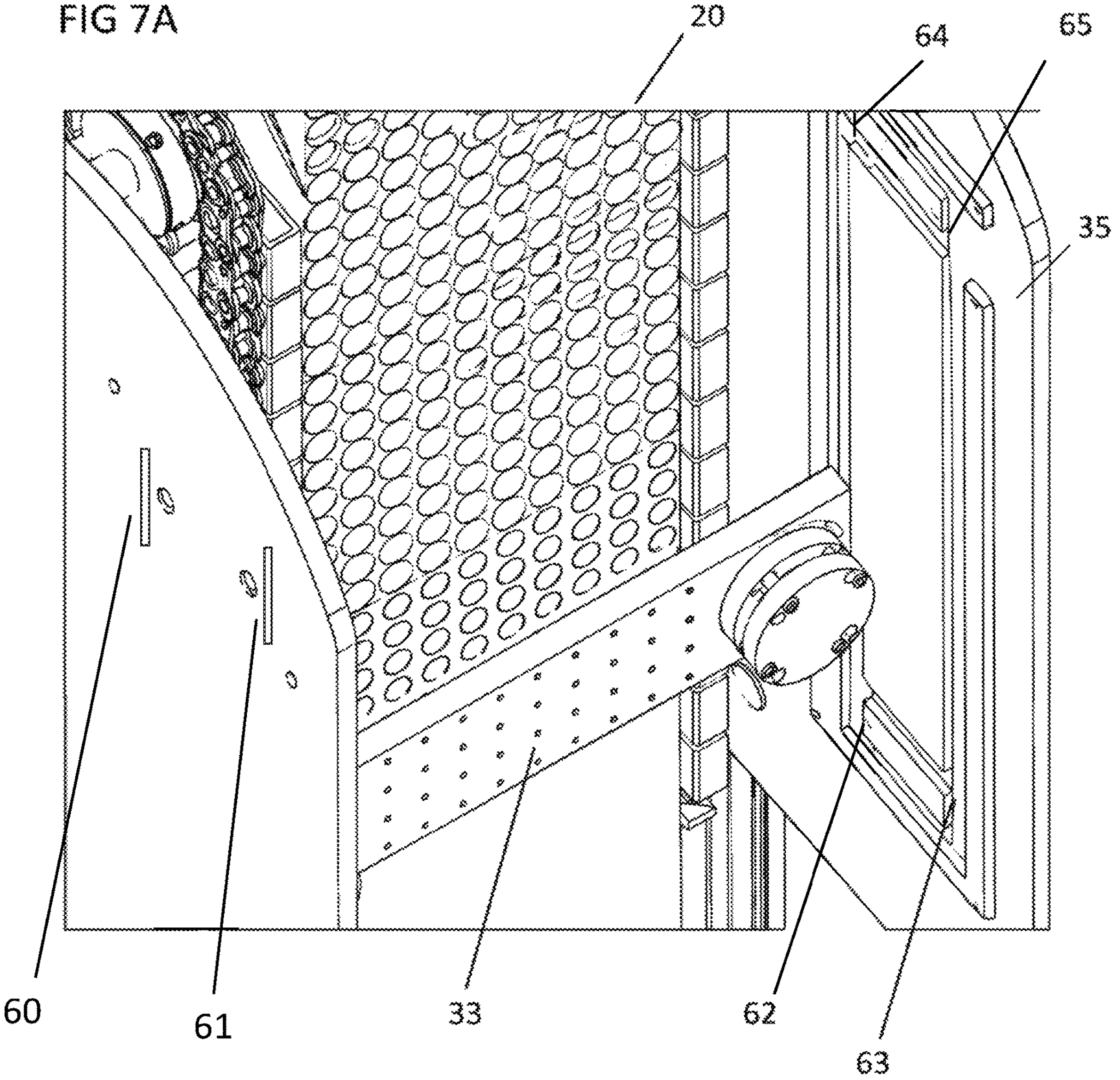
FIG. 7A is an isometric drawing of the primary gating positions for a die system within the novel continuous forming system.
Figure 7B:
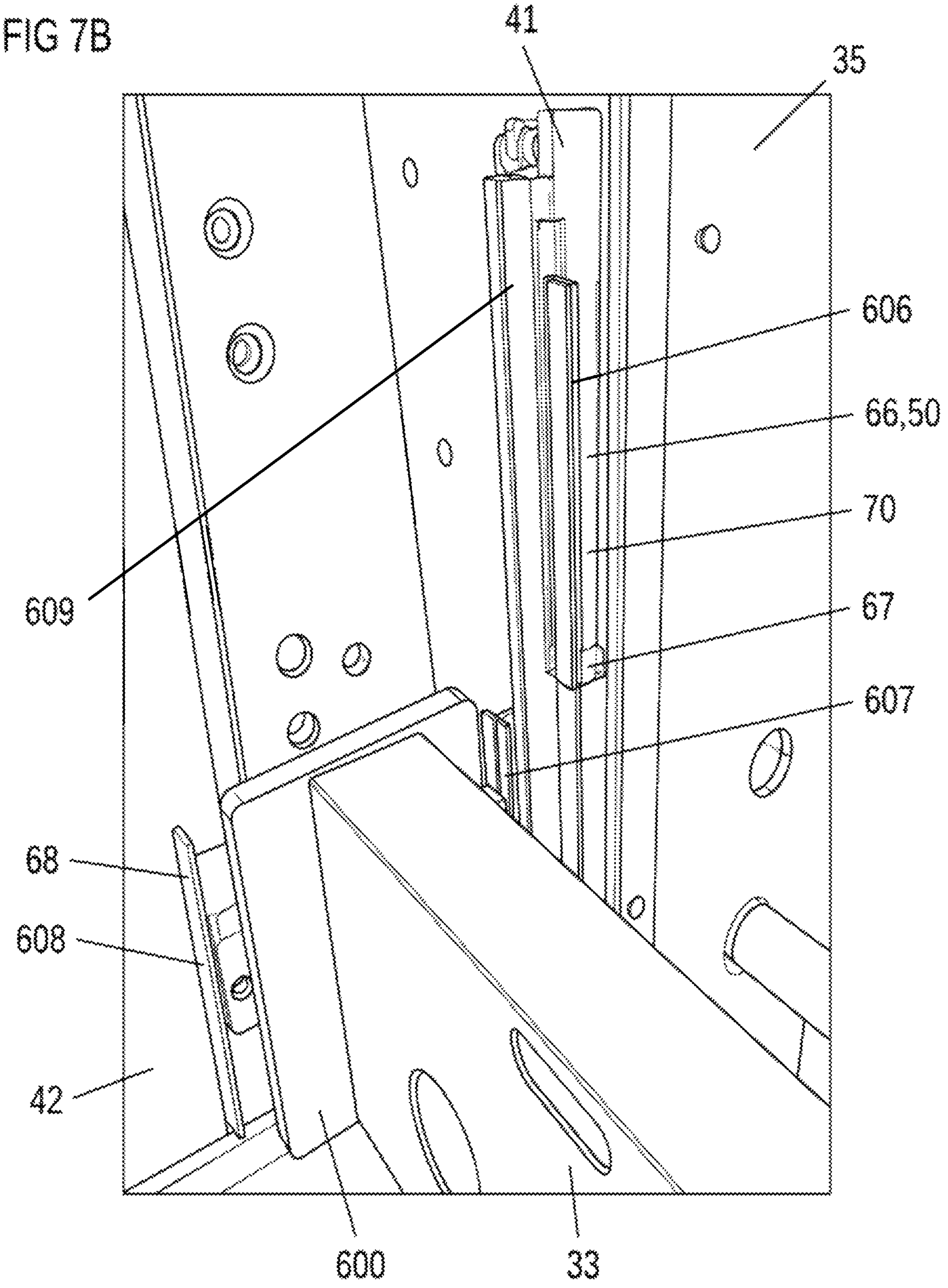
FIGS. 7B and 7C are photographs of the gating and actuation systems of the novel continuous forming system.
Figure 7C:
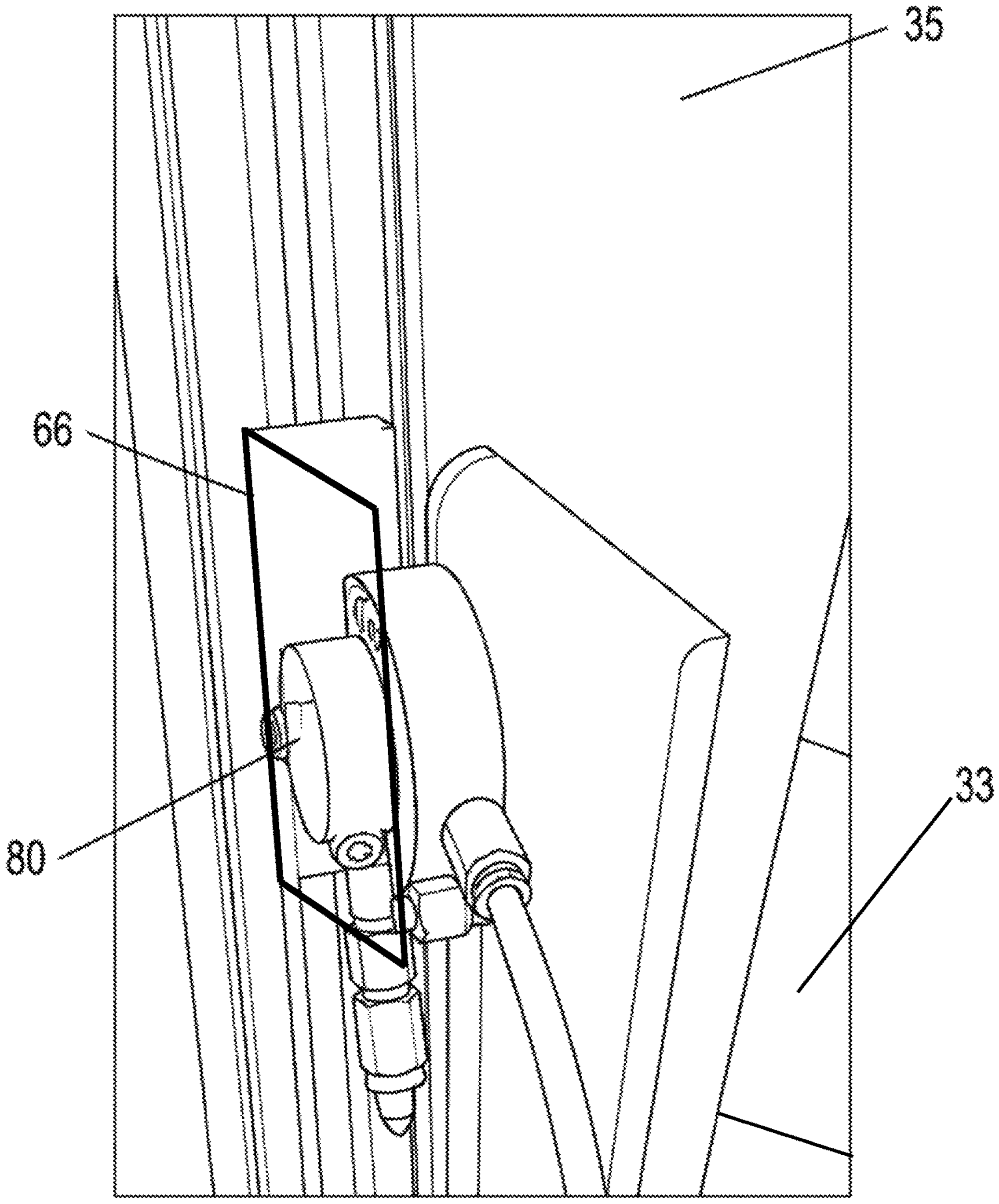

FIG. 7A is an isometric drawing of the primary gating positions for a die system within continuous forming system 20. Cut slots 60, 61, 62, 63, 64, and 65 are used to stop or allow movement of die 33 between positions along the path formed by channels 41 and 42 and areas 56 and 53. In photographs shown in FIGS. 7B and 7C, plates 606, 607, and 608 are located in slots 66, 67, and 68 respectively and moved with a piston 80 as shown in FIG. 7C and precisely control when the die is to engage or disengage or move to a staging position such as position 70. In FIG. 7B, a plate 600 helps to maintain a perpendicularity of the die 33. In FIG. 7B, a stop 609 precisely locates the die before it is pressed.

Figure 8A:
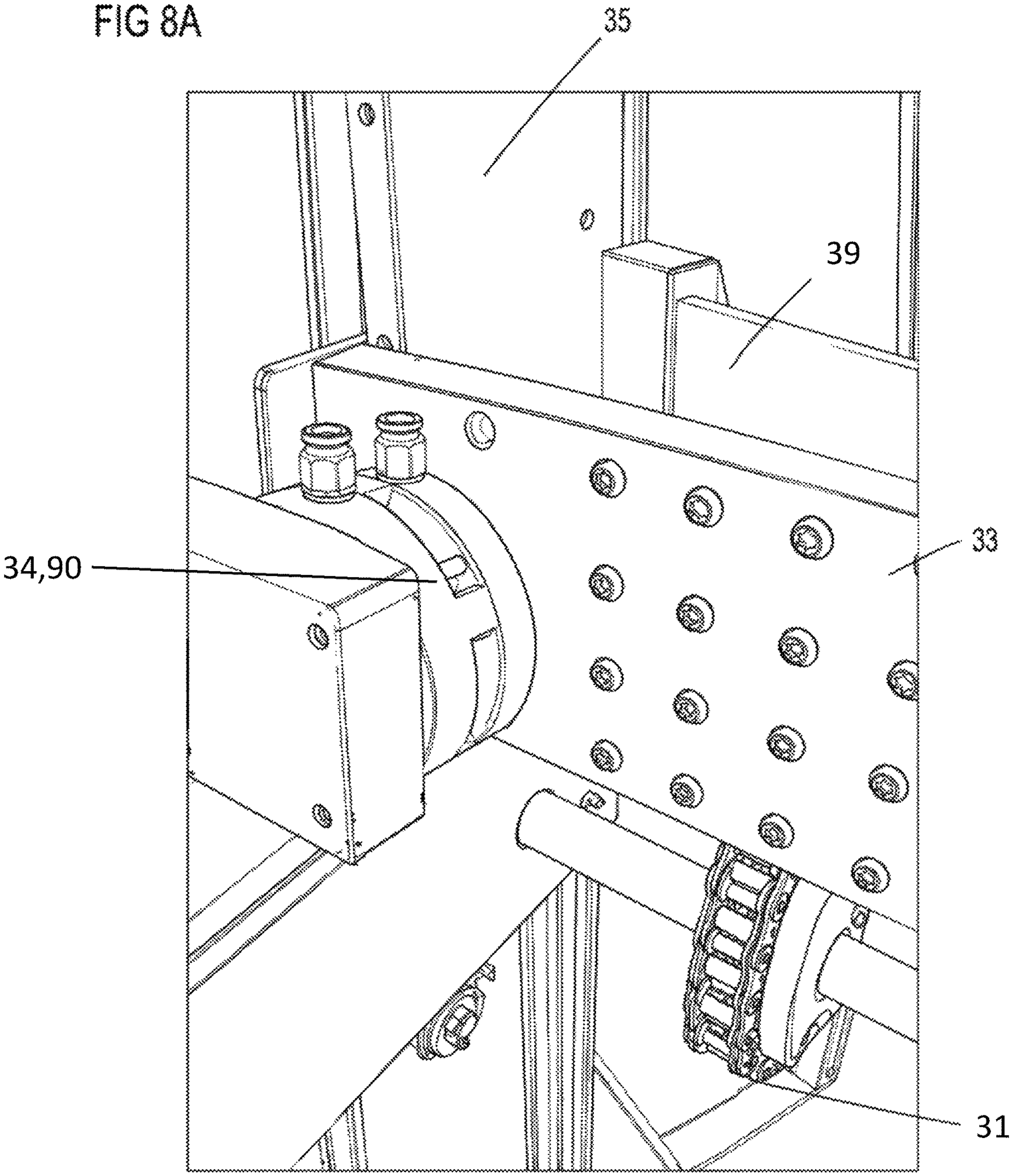
FIG. 8A is a photograph illustrating the pressing actuation system for a die within the novel continuous forming system.
Figure 8B:
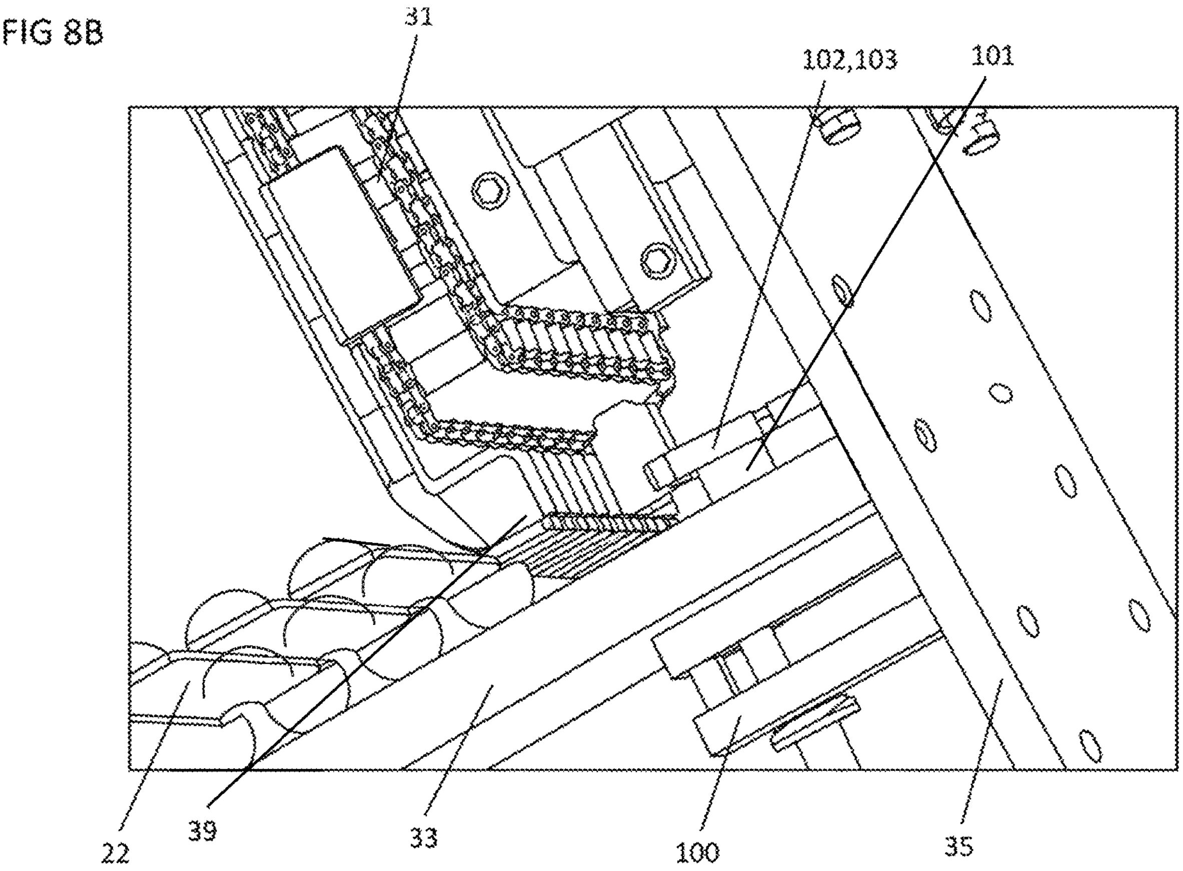
FIGS. 8B, 8C, and 8D are isometric drawings showing alternative pressing actuation systems incorporating a rotary actuator.
Figure 8C:
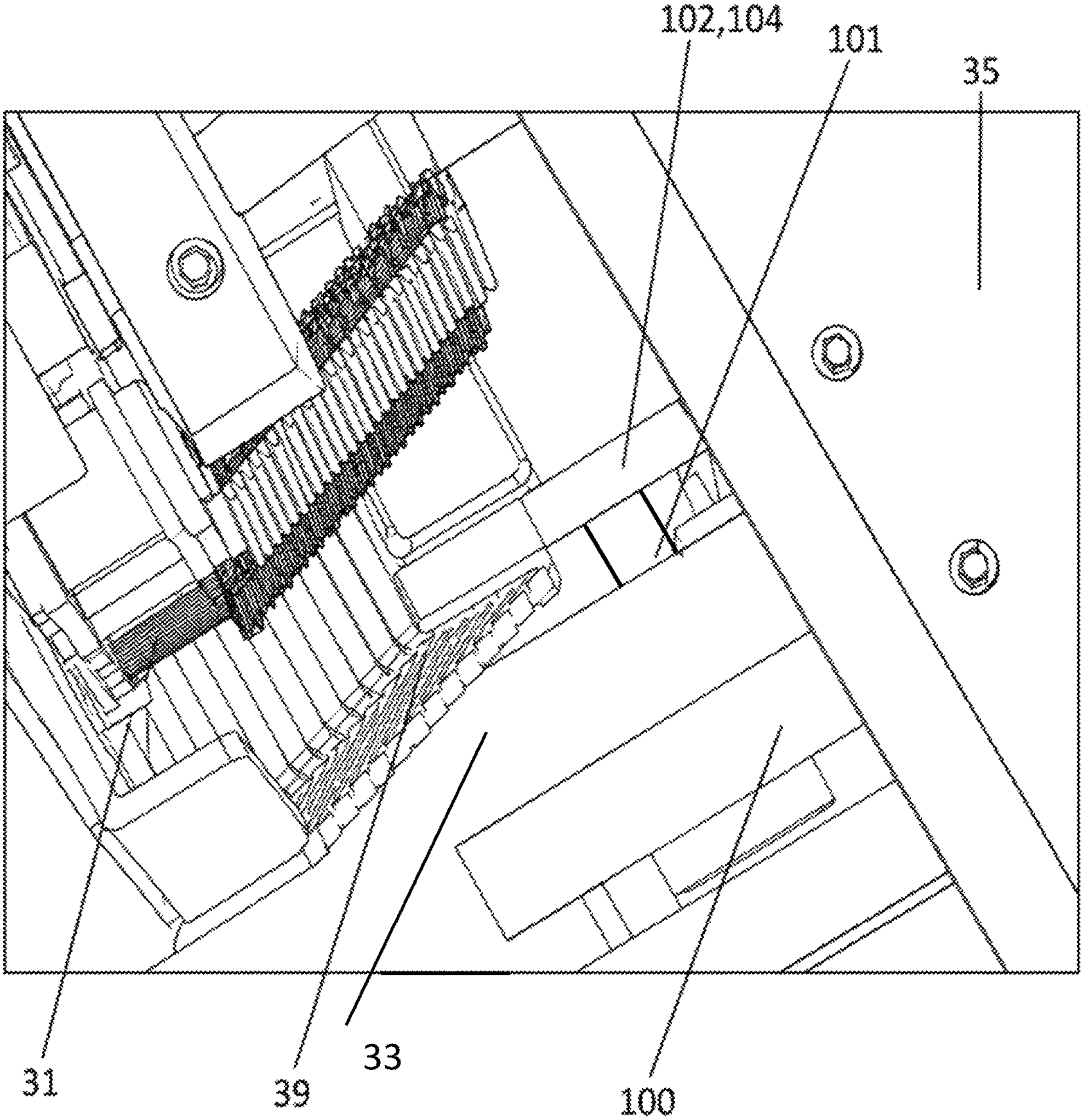
Figure 8D:
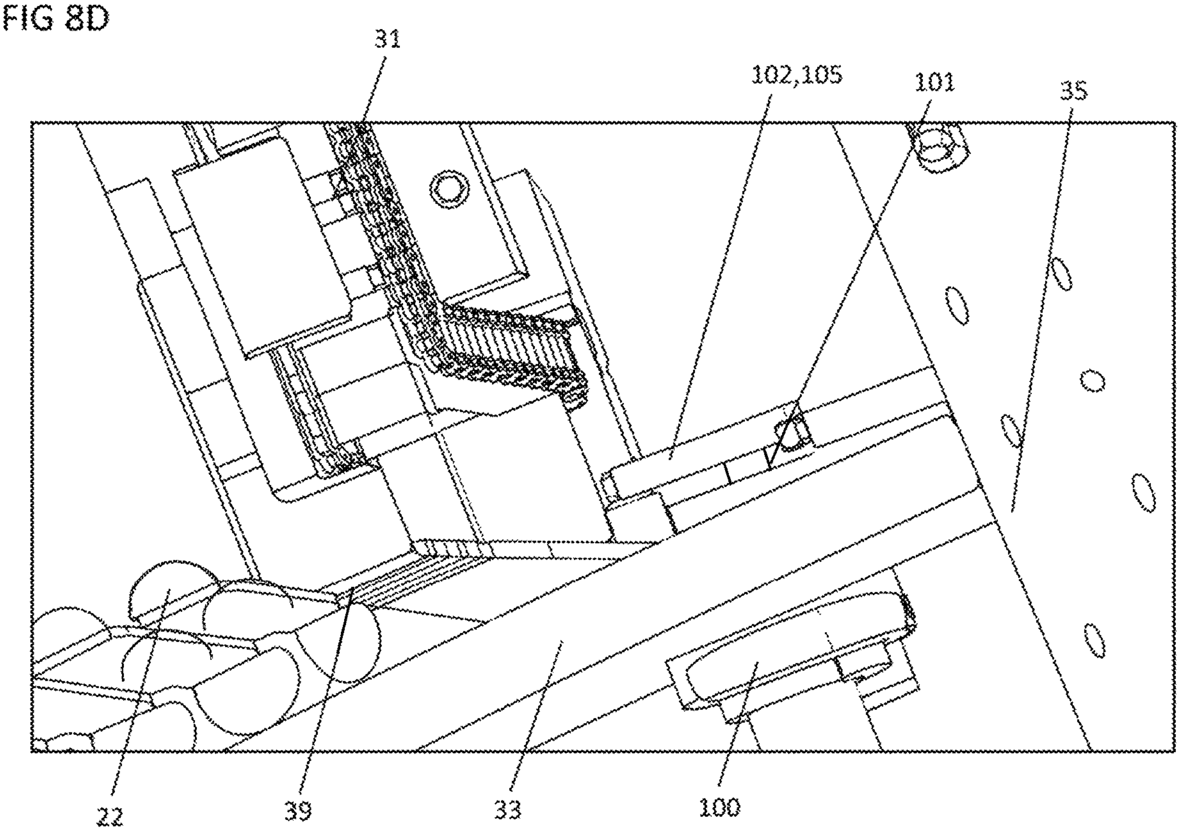

FIG. 8A is a photograph illustrating the pressing actuation system at position 50 along area 70 for die 33 within the novel continuous forming system 20. While pistons 34 of FIGS. 3 and 5 are mounted on each of the dies 33, piston 90 of FIG. 8A is mounted to plate 35 and remains stationary rather than moving with the dies. FIGS. 8B, 8C, and 8D are isometric drawings illustrating alternative pressing actuation system which is mounted on each die 33 using a rotational mechanism incorporated in piston 100. At time of pressing, the mechanical lever 102 moves from an open position 103 with extended shaft 101 of piston 100 to that of rotated lever 104 and retraction of piston 100 shown at 105. This engages the die 33 to plate 39 which is connected to chain 31 such that the compression force and strain is confined between the die 33 and plate 39 and not transferred to the side plates 35. This further helps to reduce costs of the overall system and reduces the weight and size of the system 20 compared to a conventional platen press.

Figure 9:
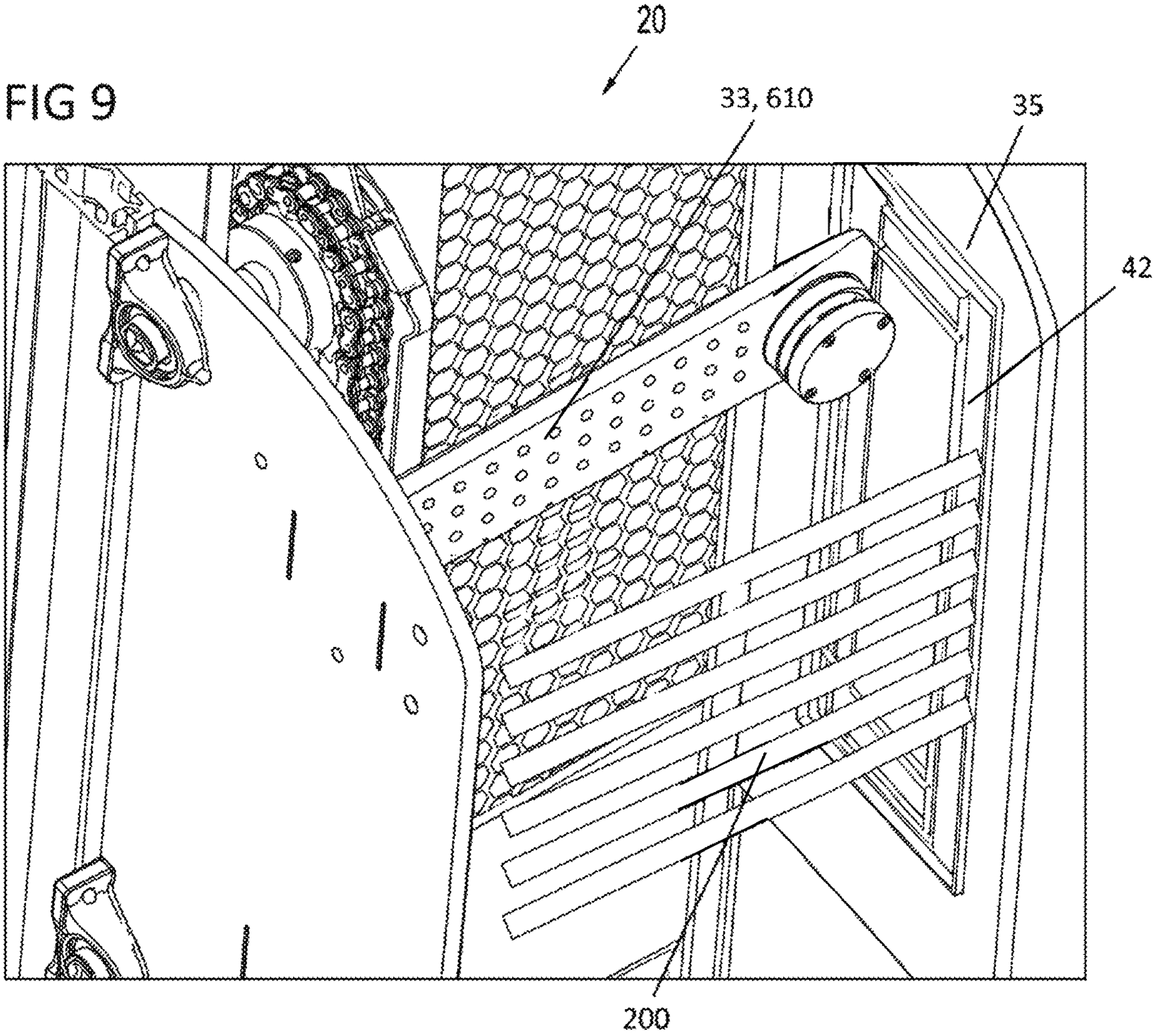
FIG. 9 is an isometric drawing illustrating the location of heaters placed in order to heat the dies.

In FIG. 9, heaters 200 are illustrated as being located along the outside of channel 42 such that the dies 33 can be heated along their motion to starting position 50. Heaters 200 may be formed of one or more types including radiant heaters, hot air convective heaters, hot liquid baths, hot rollers, electrical resistance or may include electrical contacts to activate a heater within the die. Based on the number of dies required (which in most cases is more than the distance between positions 50 and return area 53 divided by the length along the direction defined by path 41 of die 33), the speed of the chain 31 system, and the material properties of substrate 1, the power transferred to the dies can be adjusted. In the case of using a radiative heat transfer, the backing 610 of die 33 may be covered with a heat absorbing black paint.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A process for making a domed product by forming domes or protrusions into a sheet, the process comprising:

moving a die set comprising one or more domes or protrusions, wherein the die set selectively registers with the sheet;

latching the die set to the sheet after the selectively registering; and pressing the one or more domes or protrusions of the die set into the sheet for a period to obtain the domed product, wherein the die set moves independently from the sheet prior to the latching and the die set comprises die sets that move along at least two different paths along a length of the moving, and a gap between successive die sets of the die sets is adjustable prior to the pressing.

2. The process of claim 1, wherein a plurality of domed products are formed into the sheet in a continuous manner.

3. The process of claim 1, wherein the die set is heated.

4. The process of claim 1, wherein the sheet comprises a substrate comprising an adhesive layer.

5. The process of claim 4, wherein the adhesive layer is uncured.

6. The process of claim 4, wherein the adhesive layer comprises a pressure sensitive adhesive.

7. The process of claim 1, wherein the moving of the die set includes an acceleration zone where the die set is not attached to the sheet.

8. The process of claim 1, further comprising sensing a location of the die set during the moving.

9. A process for making a domed product by forming domes or protrusions into a sheet, the process comprising:

moving a die set comprising one or more domes or protrusions, wherein the die set selectively registers with the sheet;

latching the die set to the sheet after the selectively registering;

pressing the one or more domes or protrusions of the die set into the sheet for a period to obtain the domed product; and preventing or allowing the moving of the die set along a path with a gate, wherein the die set moves independently from the sheet prior to the latching.

10. The process of claim 1, further comprising integrating the domed product into a finished product.

11. The process of claim 1, wherein the die set comprises an attachment to mark the sheet with one or more of a punch, a latching, a marking or a printing.

12. The process of claim 1, wherein the die set comprises a heat absorption material and a surface not in contact with the sheet, and the heat absorption material is disposed on the surface.

13. A system to make a domed product by forming domes or protrusions into a sheet, the system comprising:

a die set comprising one or more domes or protrusions;

a die set movement to move the die set wherein the die set is moved to selectively register with the sheet and to latch the die set to the sheet after the selectively registering; and a press to press the one or more domes or protrusions of the die set into the sheet for a period to obtain the domed product, wherein the die set moves independently from the sheet prior to the latching and the die set comprises die sets that move along at least two different paths along a length of the moving and a gap between successive die sets of the die sets is adjustable prior to the pressing by the press.

14. The system of claim 13, wherein a plurality of domed products are formed into the sheet in a continuous manner.

15. The system of claim 13, further comprising a heater to heat the die set.

16. The system of claim 13, wherein the sheet comprises a substrate comprising an adhesive layer.

17. The system of claim 16, wherein the adhesive layer is uncured.

18. The system of claim 13, wherein the moving of the die set includes an acceleration zone where the die set is not attached to the sheet.

* * * * *